Feb. 9, 1954 V. W. HOWELL 2,668,918
TIDE-OPERATED POWER PLANT
Filed Feb. 5, 1952 6 Sheets-Sheet 1

INVENTOR
VERNON W. HOWELL
BY
McMorrow, Berman + Davidson
ATTORNEYS

Feb. 9, 1954  V. W. HOWELL  2,668,918
TIDE-OPERATED POWER PLANT
Filed Feb. 5, 1952  6 Sheets-Sheet 3

INVENTOR
VERNON W. HOWELL

Feb. 9, 1954  V. W. HOWELL  2,668,918
TIDE-OPERATED POWER PLANT
Filed Feb. 5, 1952  6 Sheets-Sheet 4

INVENTOR
VERNON W. HOWELL

BY
McMorrow, Berman + Davidson
ATTORNEYS

Feb. 9, 1954  V. W. HOWELL  2,668,918
TIDE-OPERATED POWER PLANT
Filed Feb. 5, 1952  6 Sheets-Sheet 5

INVENTOR
VERNON W. HOWELL
BY
McMorrow, Berman + Davidson
ATTORNEYS

Patented Feb. 9, 1954
2,668,917
Feb. 9, 1954  V. W. HOWELL  2,668,918
TIDE-OPERATED POWER PLANT
Filed Feb. 5, 1952  6 Sheets-Sheet 6
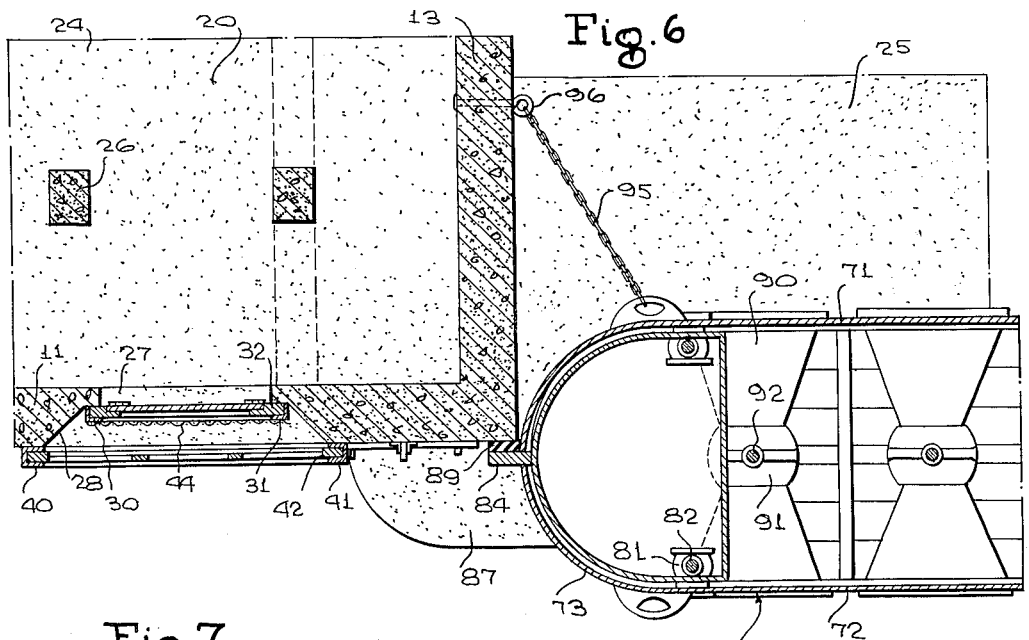
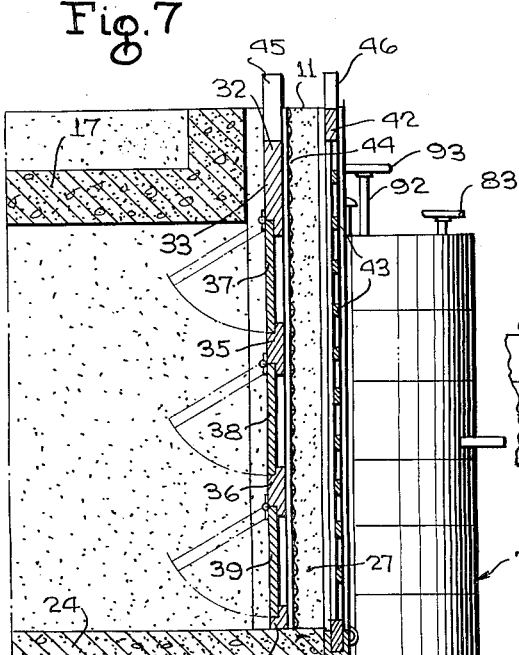
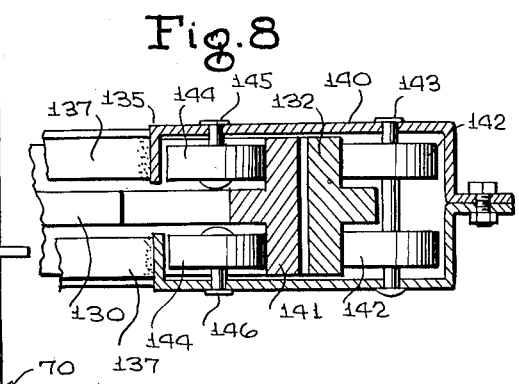

Patented Feb. 9, 1954

2,668,918

UNITED STATES PATENT OFFICE 2,668,918

TIDE-OPERATED POWER PLANT

Vernon W. Howell, Albany, Calif.

Application February 5, 1952, Serial No. 270,055

8 Claims. (Cl. 290—53)

This invention relates to tide-operated power plants, and more particularly to a power plant in which electric power is generated by the rising and falling of the tides.

It is among the objects of the invention to provide an improved tide-operated power plant which is capable of magnifying the actual rise and fall of the tide for power generation purposes; which is continuously operative even during the flood and slack of the tide; which can be conveniently provided in large sizes to generate large amounts of power and in multiple units, if desired; which operates efficiently with varying heights of the tide and is not subject to damage by extremely high tides or ordinarily by tidal waves; which can be conveniently controlled and is easy to maintain and repair; which is substantially automatic in operation; and which can be built and operated at an economical cost in comparison to the amount of power generated thereby.

Other objects and advantages will become apparent from a consideration of the following description and the appended claims in conjunction with the accompanying drawings, wherein:

Figure 2:
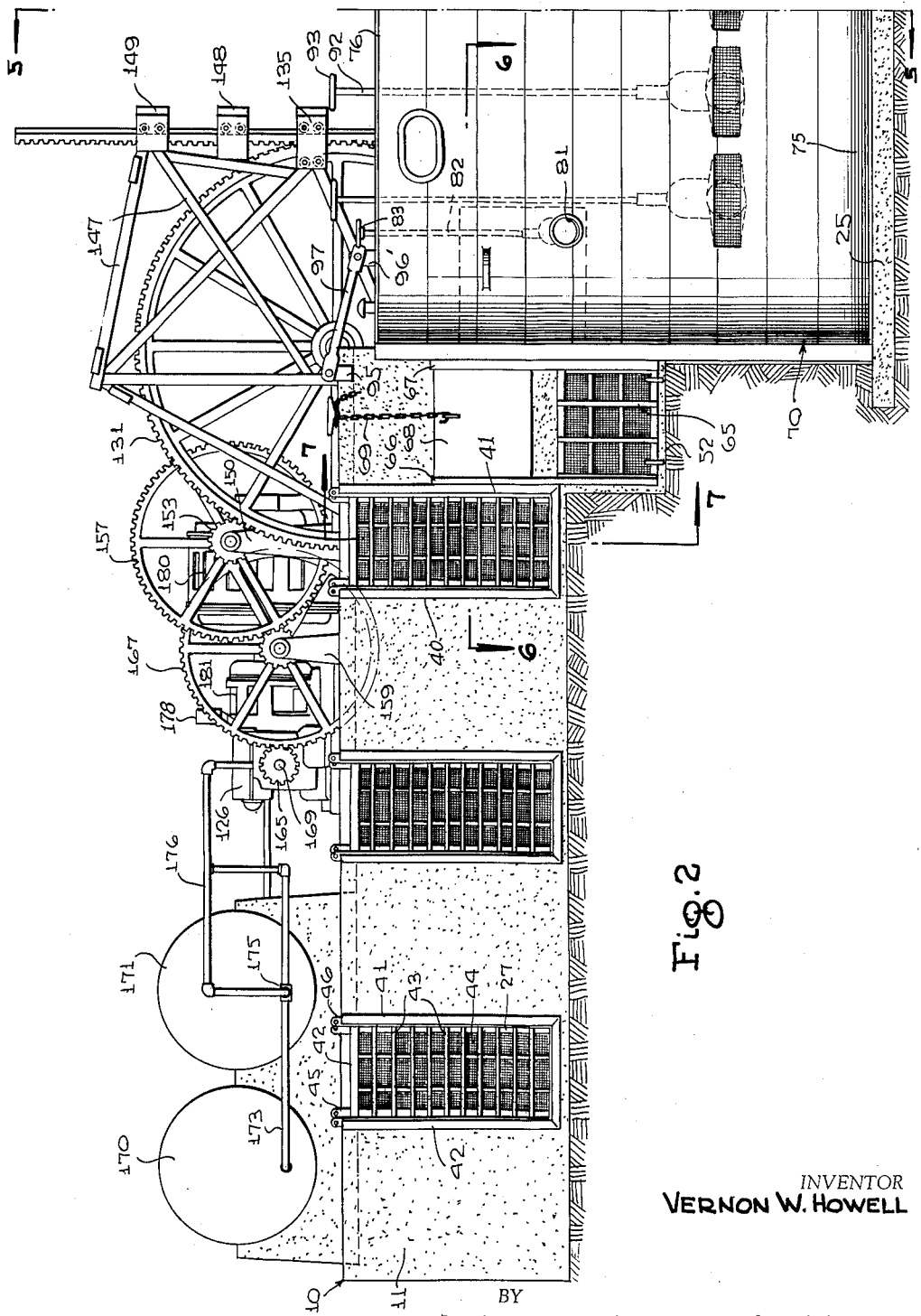
Figure 2 is a front or water side elevational view of a portion of the power plant illustrated in Figure 1.
Figure 5:
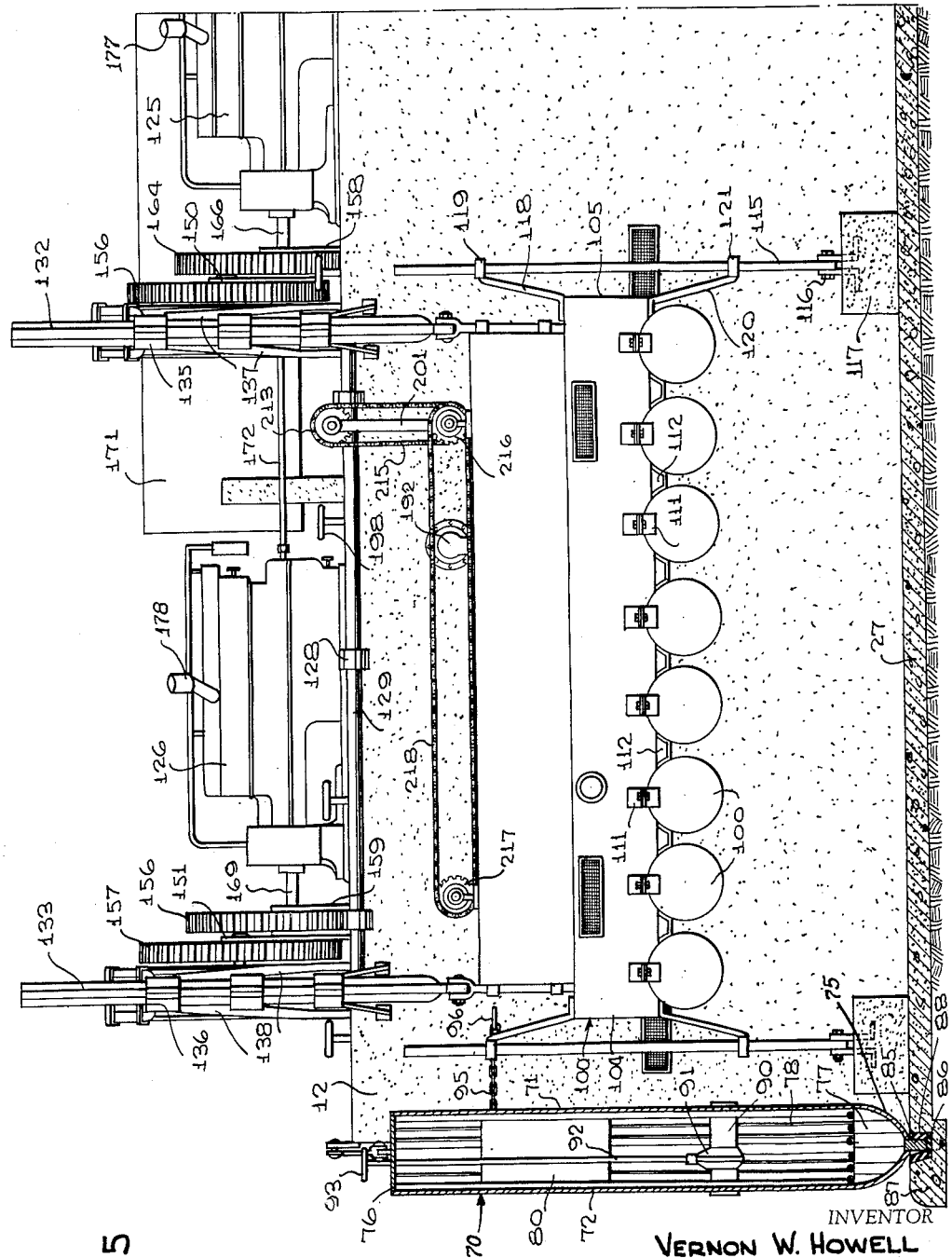

Figures 5 and 5a together constitute a cross-sectional view on the line 5—5 of Figure 2;

Figure 6 is a fragmentary cross-sectional view on the line 6—6 of Figure 2;

Figure 7 is a fragmentary cross-sectional view on the line 7—7 of Figure 2; and

Figure 3:
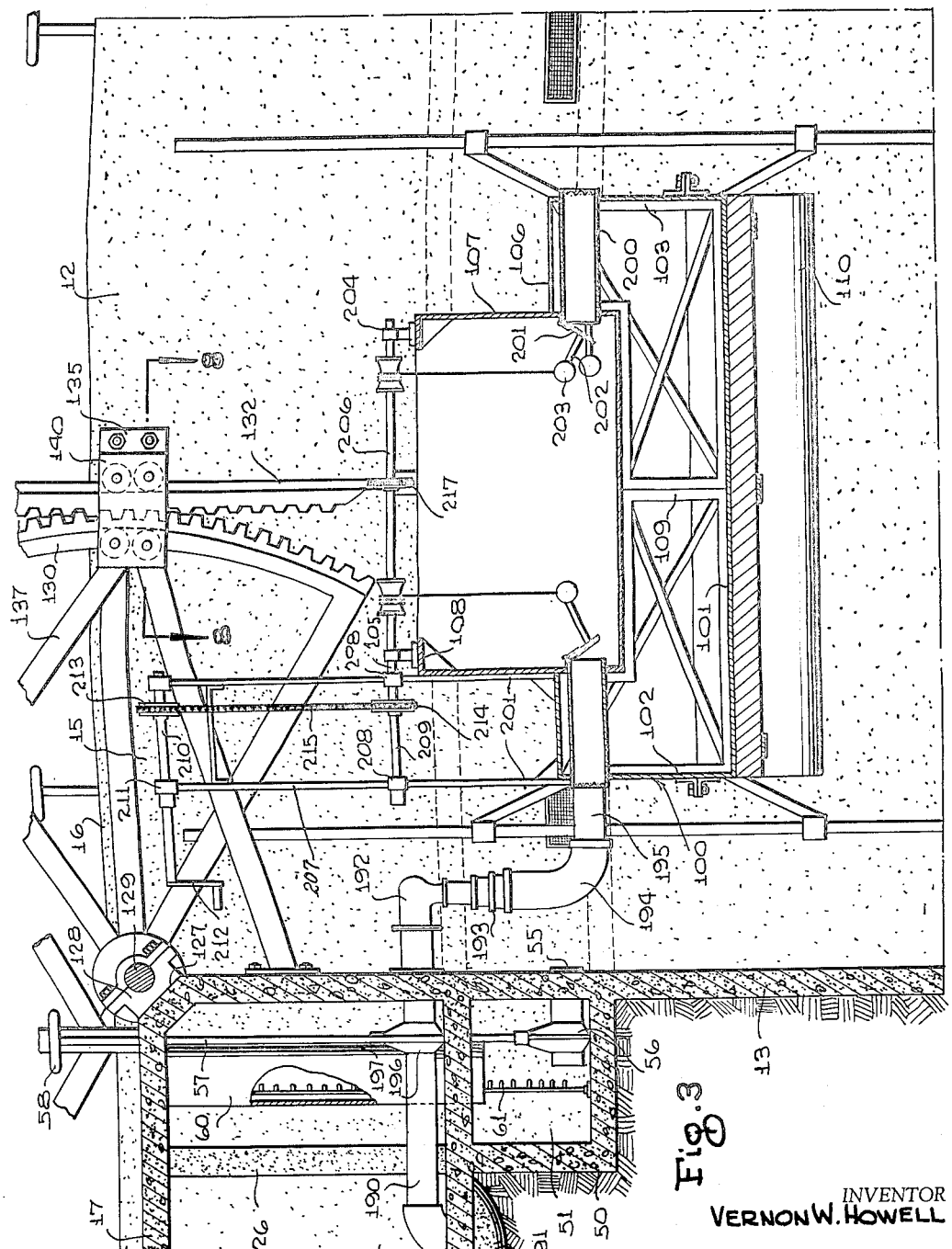
Figure 3 is a fragmentary cross-sectional view on an enlarged scale on the line 3—3 of Figure 1.

Figure 8 is a fragmentary cross-sectional view on the line 8—8 of Figure 3.

With continued reference to the drawings, the power plant comprises a reinforced concrete structure, generally indicated at 10, of elongated, rectangular shape having one side 11 thereof disposed in the water of a large body of water, such as an ocean, subject to rising and falling tides. The concrete structure provides intermediate the length thereof a basin of rectangular shape having spaced apart and substantially parallel side walls 13 and 14, and an end wall 15 at the end of the basin remote from the water side of the structure. The end wall 15 of the basin is spaced inwardly from and substantially parallel to the side wall 16 of the concrete structure 10 at the side of the structure remote from the water side 11, and the water end of the basin 12 is open. The reinforced concrete structure 10 provides large platforms 17 and 18 of elongated, rectangular shape disposed one at each side of the basin 12 and a connecting platform 19 extending between the end wall of the basin and the landward side wall 16 of the concrete structure and connecting the platforms 17 and 18. Cisterns, one of which is generally indicated at 20 in Figure 3, are provided one under each of the platforms 17 and 18.

The cisterns are enclosed by the end walls 21 and 22 and the side walls 11 and 16 of the concrete structure 10, and by the side walls 13 and 14 of the basin 12, there being an interconnecting cistern portion between the end wall 15 of the basin and the side wall 16 of the concrete structure, and a partition 23 extending transversely of this space substantially perpendicular to the side wall 16 and end wall 15 separating the two cisterns.

The cisterns have bottom walls or floors, as indicated at 24, substantially at low water level, and the basin 12 has a bottom wall or floor 25 disposed a considerable distance below low water.

Columns 26 extend vertically from the floors of the cisterns to the platforms 17 and 18 at spaced apart locations to support the platforms, and the water side wall 11 of the concrete structure is provided with vertically extending openings of rectangular shape, as indicated at 27, disposed at spaced apart locations along these walls and the corresponding ends of the cisterns. Each of the openings 27, as particularly illustrated in Figures 6 and 7, extends substantially from the bottom wall or floor 24 of the cistern to the corresponding platform 17 or 18, and is somewhat smaller at the inner side of the wall 11 than at the outer side, the wall 11 being outwardly beveled along the opposite sides of each opening, as indicated at 28 in Figure 6. A pair of angle or channel irons 30 and 31 are secured to the outer side of the wall 11, one at each side of the opening 27 and at the inner edges of the beveled faces 28 of the wall. A rectangular frame 32 is slidably mounted at its opposite longitudinal edges in the channel irons 30 and 31 for vertical movement into and out of covering relationship to the opening 27, and a flap valve structure is mounted on the frame 32. The frame 32, in addition to the longitudinal or vertically disposed members slidably received in the channel irons 30 and 31 includes top and bottom transverse members 33 and 34, and intermediate transverse members 35 and 36 uniformly spaced from the top and bottom transverse members and from each other, and rabbeted along their inner edges, the top and bottom transverse members 33 and 34 also being rabbeted along their inner lower and upper edges, respectively. Valve plates 37, 38 and 39, of elongated, rectangular shape, are hinged at their upper edges to the lower edges of the top transverse member 33, and the intermediate transverse members 35 and 36, respectively, and engage at their lower edges the upper edges of the transverse members 35 and 36 and the bottom transverse member 34, respectively, the upper and lower edges of the valve plates being received in the rabbeted edges of the transverse members, so that the valve plates can move inwardly of the frame 32, as indicated by broken lines in Figure 7, but cannot move outwardly of the frame, and serve to completely close the corresponding opening 27 in the wall 11 when in their vertical positions, as illustrated in Figure 7. With this arrangement, tide water can flow into the corresponding cistern through the openings 27 as the tide rises, but cannot flow out of the cisterns as the tide falls, tidewater to the maximum height of the tide being trapped in the cisterns with each rise of the tide.

Channel irons 40 and 41 (Figure 6) are secured to the outer side of the wall 11 one at each side of each opening 27, and at the outer edges of the beveled faces 28 of the openings, and a frame 42, of elongated, rectangular shape, is slidably mounted in the channel irons 40 and 41. A heavy grid 43 is mounted in the frame 42 to prevent large and heavy objects floating in the water from passing through the outer portion of the opening 27 and damaging the valve structure, and a screen 44 of suitable material, such as wire mesh, is mounted on the outer side of the frame 32 to prevent water-carried trash and debris from entering the valve structure and interfering with the operation thereof.

The valve structure is entirely automatic, the valve plates being opened inwardly by the pressure of water against the outer sides thereof and being automatically closed by the pressure of water against the inner sides thereof when the tide falls.

Each side member of the frame 32 is provided at its upper end with an eye, as indicated at 45, and each side member of each frame 42 is provided at its upper end with an eye, as indicated at 46, for the attachment of suitable hoisting means to lift the frames to lift the frames out of the corresponding guides when necessary for repair or replacement of the frames.

As the valve structures, grids and screens for all of the openings 27 may be substantially identical, the above-detailed illustration of one such assembly is considered sufficient for the purposes of the present disclosure.

Figure 4:
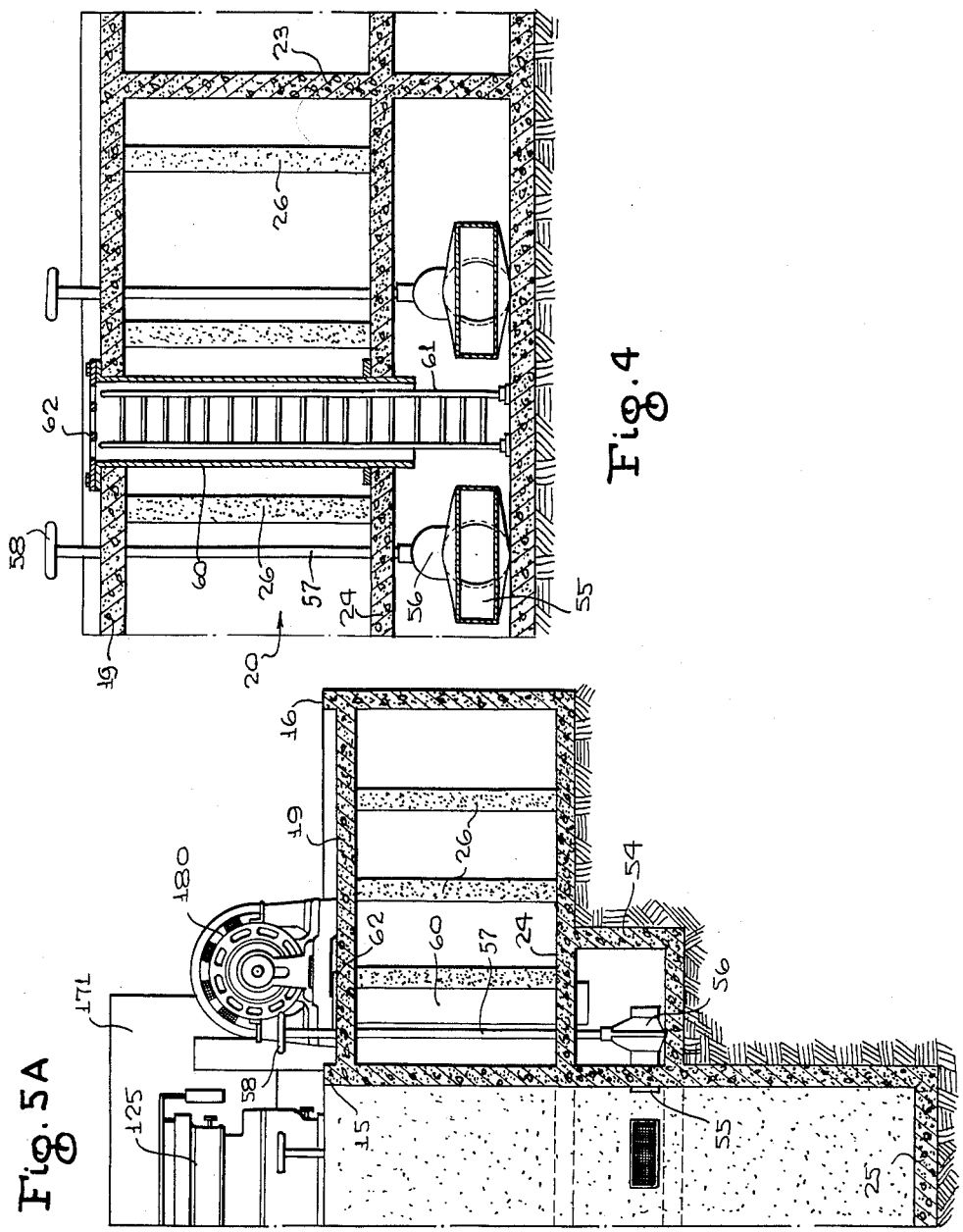
Figure 4 is a fragmentary cross-sectional view on the line 4—4 of Figure 1.

A reinforced concrete structure 50 extends along the outer side of the side wall 13 of the base 12 at the under side of the corresponding cistern floor 24 and provides a chamber 51 of rectangular cross-sectional shape extending along the outer side of the wall 13 and opening at one end to the outer side of the wall 11, as indicated at 52 in Figure 2. A similar structure 53 extends along the outer side of the basin side wall 14 at the under side of the corresponding cistern floor, and also provides a chamber of rectangular shape opening at one end through the wall 11 at the corresponding side of the basin, and a third structure 54 extends along the outer side of the basin end wall 15 at the under side of the cistern bottom wall and provides a chamber of rectangular shape connecting the chambers provided by the structures 50 and 53 at the inner ends of these chambers. The three chambers thus provided constitute a water passage extending along both sides and across the closed end of the basin 12 for carrying tidewater around the basin, and conduits 55 extend through the walls 13, 14 and 15 at spaced apart locations along these walls and adjacent the upper surfaces of the bottom wall structures 50, 53 and 54, for the passage of water in the chambers provided by these structures into the basin 12. A gate valve, as indicated at 56 (Figures 3, 4 and 5a), is provided in each conduit 55 within the corresponding chamber, and a valve-operating shaft, as indicated at 57, extends upwardly from each valve 56 through the corresponding platform 17, 18 or 19, and is provided at its upper end with a hand wheel 58 for operating the associated valve so that the flow of water from the chambers within the structures 50, 53 and 54 into the basin 12 can be manually regulated.

Manhole tubes 60 extend from the platforms through the cisterns into the chambers provided by the structures 50, 53 and 54 to provide access to the valves 56, and ladders, as indicated at 61, extend one through each of the tubes 60 substantially from the floors of the structures 50, 53 and 54 to the corresponding platforms, so that workmen may enter and leave the chambers, such as the chamber 51. The upper ends of the tubes 60 are normally covered by manhole covers, as indicated at 62.

Manholes are provided in the platforms 17 and 18, one adjacent each of the openings 27 in the water wall 11 of the structure, and at other locations in the platforms to provide access to the cisterns below the platforms, and these manholes are covered by suitable manhole covers, as indicated at 63.

Reinforced screens, as indicated at 65, are disposed in closing relationship to the ends of the chambers in the structures 50 and 53 opening through the side wall 11 of the structure 10, guides, as indicated at 66 and 67 are mounted on the other side of the wall 11, one at each side of each of the chamber openings, and slide gates, as indicated at 68, are mounted in each pair of guides and vertically movable by suitable means, such as the chain 69, into and out of closing relationship with the corresponding ends of the chambers to open the chambers for the free passage of water into and out of the chambers or to close off the chambers and exclude water therefrom during such periods as it may be necessary for workmen to be present in the chambers.

A gate, generally indicated at 70, is disposed in closing relationship to the open end of the basin 12 and comprises a hollow structure having spaced apart and substantially parallel side walls 71 and 72, substantially semicylindrical end walls 73 and 74 convexly disposed one at each end of the gate, a substantially semicylindrical bottom wall 75 convexly disposed at the bottom of the gate, and a flat top wall or deck 76 at the top of the gate. A ballast 77 formed of suitably heavy material, such as concrete blocks, is disposed in the bottom portion of the gate and lines 78 may be connected each to one of the ballast blocks and extended to the top of the gate for removing ballast blocks from or adding ballast blocks to the gate, as may be found necessary. Ballast tanks, as indicated at 80, are disposed in the gate one at each end thereof, and conduits extend through the side walls 71 and 72 of the gate and into each of these ballast tanks.

Valves, as indicated at 81, are mounted one in each of these conduits and valve-operating shafts, as indicated at 82, extend one from each valve through the top wall or deck 76 of the gate and carry hand wheels, as indicated at 83, at their upper ends so that the valves can be opened and closed to admit water into or discharge water from the ballast tanks in the gate to regulate the buoyancy of the gate to the depth of the water at the open end of the basin 12.

Flanges of rectangular cross-sectional shape, as indicated at 84, extend vertically one along each end of the gate with their center lines substantially in a plane disposed parallel to and midway between the side walls 71 and 72 and a flange 85 extends along the bottom of the gate with its longitudinal center line substantially in the same plane. A groove 86 is provided in an apron 87 at the bottom of the open end of the basin 12, and a grooved packing 88 of resilient material is disposed in the groove 86 and receives the bottom flange 85 of the gate to provide a water-tight seal between the bottom of the gate and the bottom or floor of the basin. Packing strips of resilient material, as indicated at 89, are disposed on the outer surface of the wall 11, one along each side of the open end of the basin and the end flanges 84 of the gate bear against these packing strips to provide water-tight seals between the ends of the gate and the concrete structure at the opposite sides of the open end of the basin 12.

Conduits 90 extend transversely through the gate and through the side walls 71 and 72 intermediate the height of the gate and substantially at the location of the lowest tide level at the location of the power plant, and valves, as indicated at 91, are disposed one in each of the conduits 90. Valve handles 92 extend upwardly one from each valve 91 through the deck 76 of the gate, and a hand wheel, as indicated at 93, is mounted on the upper end of each valve shaft 92 for controlling the corresponding valves 91. The valves 91 are used to admit water into the basin 12 or permit water to flow from the basin during unusual tide conditions, and are not necessarily used at all times during the operation of the power plant.

Chains, as indicated at 95 in Figure 6, are connected to the side walls of the gate below the deck 76, and are engageable with hooks or other fasteners 96 secured in the walls 13 and 14 and projecting from these walls into the basin 12 for supporting the gate in position in the open end of the basin while the gate is being properly ballasted into a set condition in the opening and rigidly secured to the structure at the opposite sides of the open end of the basin.

Lug plates, as indicated at 95' in Figure 2, are mounted on the structure 10 one at each side of the open end of the basin 12 and project upwardly from the structure and have apertures extending therethrough above the structure. Complementary lug plates 96' are mounted on the gate 70 one near each end thereof and extend upwardly above the deck 76 and are provided with apertures above the deck. Links, as indicated at 97, are connected each at one end to a corresponding lug plate 95', and at its other end to a corresponding lug plate 96' to secure the gate 70 in the open end of the basin 12 and in sealing engagement with the binding strips 89 and the packing 88, so that the gate effectively closes the open end of the basin 12 against the entry of water into or the passage of water out of the basin.

A float, generally indicated at 100, of elongated, rectangular shape, is disposed in the basin 12 adjacent and substantially parallel to the side wall 13 of the basin. This float comprises a hollow, rectangular body having a bottom wall 101, side walls 102 and 103, end walls 104 and 105, and a top wall 106. The top wall is provided with an opening of elongated, rectangular shape and a tank 107, of elongated, rectangular shape, is set into the opening in the top wall or deck 106 of the float and extends above and below the float deck. The tank 107 has an open upper end bordered by inwardly directed flanges 108, and is supported at its bottom on a framework 109 disposed in the float body. This framework 109 also reinforces the float body and maintains the body in a substantially rigid condition. The float also includes a plurality of cylindrical drums or tanks 110 disposed immediately below the bottom wall 101 of the float body and extending transversely of the bottom wall of the float body in closely spaced relationship to each other. These drums 110 are secured to the float body by suitable means, such as the interconnected lug 111 secured to the side walls of the float body and to the ends of the corresponding drums 110 and secured together by separable means to detachably secure the same to the body and the tanks are held in spaced apart relationship by suitable means, such as the filler strips 112 extending transversely of the bottom wall of the float body one between each two adjacent drums 110.

The float body and the drums 110 are filled with air and are hermetically sealed to give buoyancy to the float, and the tank 107 is of sufficient size that when it is completely filled with water it overcomes the buoyancy of the float body and the drums 110 and causes the float to sink.

The float 100 is guided in its vertical movement by vertically disposed guide rods 115 disposed one adjacent each corner of the float and spaced outwardly therefrom. These rods are pivotally connected at their lower ends to lugs 116 secured in base blocks 117 mounted on the bottom wall or floor 25 of the basin.

Brackets are mounted on the float at each corner thereof, and the brackets mounted at each corner of the float include an upwardly extending bracket 118 having at its upper end an eye 119 slidably receiving the corresponding guide rod 115 and a lower bracket 120 having at its lower end an eye 121 also slidably receiving the guide rod 115 at a location spaced from the eye 119.

Figure 1:
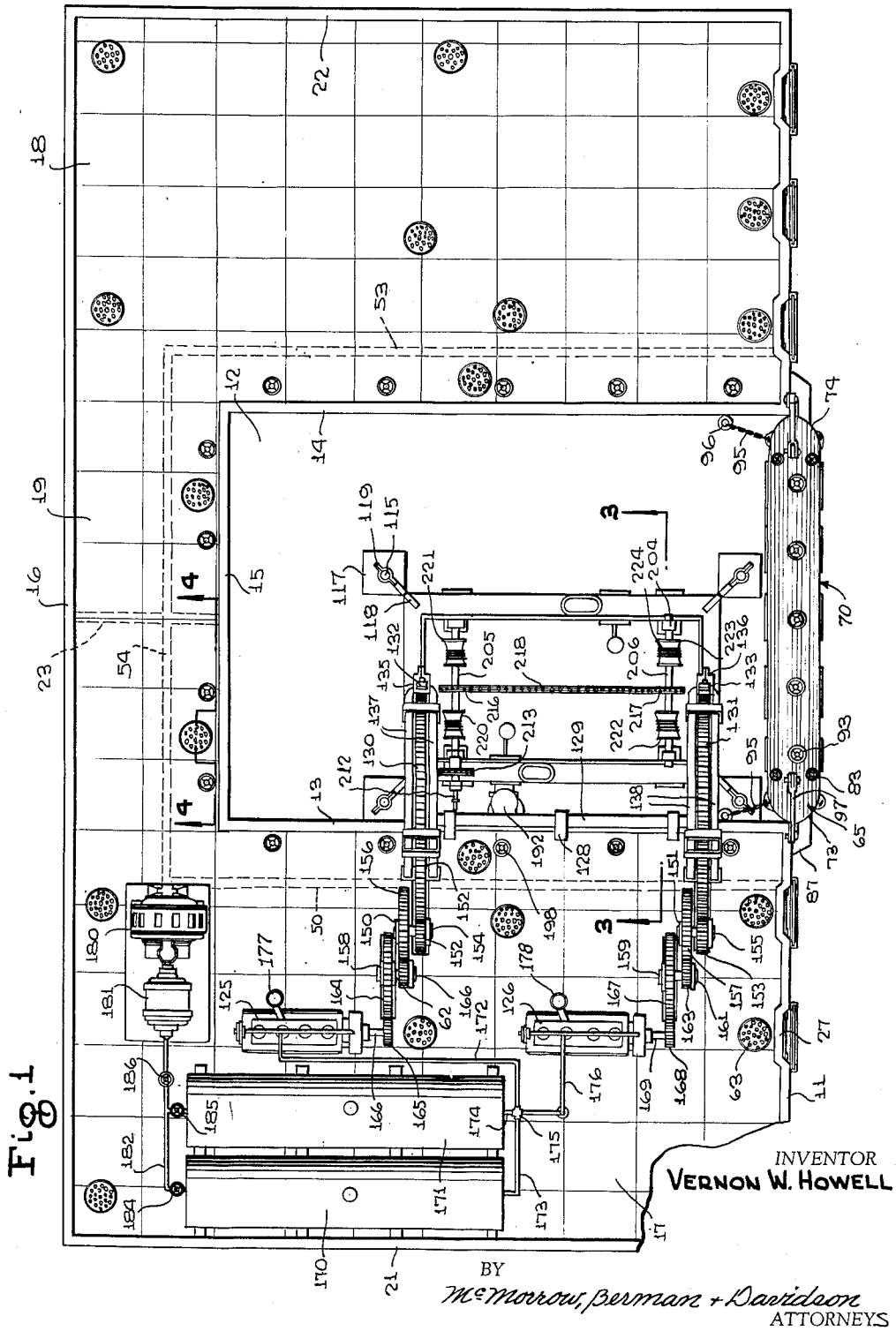
Figure 1 is a top plan view of a tide-operated power plant illustrative of the invention.

With this arrangement, the float can rise and descend vertically in the basin 12 as the level of the water in the basin rises and falls, but is restained against lateral movements. Positive displacement air compressors 125 and 126 (Figure 1) are mounted at spaced apart locations on the platform 17, and the float 100 is drivingly connected to these air compressors by means presently to be described.

The side wall 13 of the basin 12 is upwardly and outwardly beveled at its upper edge at an angle of approximately 45° to the horizontal, as indicated at 127 in Figure 3, and journal boxes, as indicated at 128, are mounted on the beveled face of the wall 13 at spaced apart locations along such face. A shaft 129 extends along the beveled face of the side wall 13 and is journaled in the journal boxes 128.

Two sector gears 130 and 131 are mounted on the shaft 129 one near each end of the shaft and near the respectively opposite ends of the float 100. These gears have a radius such that they extend from the shaft 129 substantially to a vertical plane which includes the longitudinal center line of the float 100.

Rack bars 132 and 133 are pivotally mounted at their lower ends on the float 100, one at each end of the float and adjacent the mid-width location of the latter and these rack bars extend upwardly from the float and mesh with the sector gears 130 and 131, respectively, to impart rotational movements to the sector gears as the float moves up and down in the basin 12.

The rack bars are maintained in mesh with the corresponding sector gears by clamp devices, as generally indicated at 135 and 136 mounted on the outer ends of frame structures 137 and 138 which are mounted at their inner ends on the side wall 13 of the basin and the platform 17 and are disposed one at each side of each of the sector gears 130 and 131.

The clamp structures 135 and 136 are substantially identical in construction, and the clamp structure 135 has been illustrated in detail in Figure 8. This structure comprises a two-part housing 140 which extends around the rack bar 132 and the rim 141 of the sector gear 130, a pair of rollers 142 journaled in spaced apart relationship in one end of the housing 140 by an axle pin 143 extending through the rollers and through apertures in the side walls of the housing and bearing against the outer surface of the rack bar 132 and rollers 144 journaled in the other end of the housing by axle pins 145 and 146 and bearing against the inner side of the rim 141 of the sector gear 130, the rollers 142 and 144 holding the rack bar and the rim of the sector gear together with the rack bar teeth in mesh with the gear teeth.

Superstructures, as illustrated in Figure 2 and indicated at 147, are mounted on each of the frames 137 and 138 and each of these superstructures carries guide clips, as indicated at 148 and 149 vertically spaced apart above the clamps 135 and 136. Each of the guide clips includes a hollow housing of rectangular shape secured to the corresponding superstructure 147 and surrounding the corresponding rack bar and rollers journaled in the housing and bearing against the outer side of the rack bar to hold the rack bars in substantially vertical positions.

Two pairs of spaced apart bearing brackets, as indicated at 150 and 151, are mounted on the platform 17 and extend upwardly therefrom at spaced apart locations. A spur gear 152 is disposed between and journaled on the bearing bracket 150, and a spur gear 153 is disposed between and journaled on the brackets 151.

The gear 152 has a radius materially less than the radius of the sector gear 130, and meshes with the sector gear while the gear 153 has a radius materially less than the radius of the sector gear 131 and meshes with this sector gear.

The gears 152 and 153 are mounted on axles 154 and 155, respectively, journaled in the brackets 150 and 151, and a gear 156 larger than the gear 152 is mounted on the axle 154 beside the gear 152, while a gear 157 larger than the gear 153 is mounted on the axle 155 beside the gear 153. Pairs of bearing brackets 158 and 159 are mounted on the platform 17 at locations spaced from the brackets 150 and 151, and axles 160 and 161 are journaled in the brackets 158 and 159, respectively. A gear 162 is mounted on the axle 160 and meshes with the gear 156, the gear 162 being smaller than the gear 156, and a gear 163 smaller than the gear 157 is mounted on the axle 161 and meshes with the gear 157.

A gear 164 larger than the gear 162 is mounted on the axle 160 beside the gear 162 and meshes with a gear 165 on one end of the drive shaft 166 of the air compressor 125, while a gear 167 larger than the gear 163 is mounted on the axle 161 beside the gear 163 and meshes with a gear 168 on one end of the drive shaft 169 of the air compressor 126.

The above-described gear trains provide speed-increasing drives between the float 100 and the air compressors 125 and 126. These air compressors are operative in either direction of rotation and are effective to compress air as the float 100 is moved up and down in the basin 12 by the rising and falling of the water level in the basin incident to the rising and falling of the tide.

Compressed air storage tanks 170 and 171 mounted on the platform 17 adjacent the air compressors 125 and 126 and the air compressor 125 is connected to these tanks by the compressed air pipes 172, 173 and 174, and the T-fitting 175, while the air compressor 126 is connected to the storage tanks by the pipes 176, 173 and 174 and the T-fitting 175. The compressors are respectively provided with air filters and cleaners, as indicated at 177 and 178, for cleaning the intake air to the compressors.

An electric current generator 180 is mounted on the platform 17, and a compressed air motor 181 is mounted on the platform and drivingly connected to the generator 180. The storage tanks 170 and 171 are connected to the compressed air motor 181 through the pipes 182 and 183, manually operated cut-off valves 184 being connected into these pipes for controlling the supply of compressed air to the motor 181, and a pressure-regulating valve 186 being connected into the pipe 182 adjacent the motor 181 for maintaining the pressure of the compressed air supplied to the motor substantially constant.

The compressors 125 and 126 have a capacity sufficient to at intervals store compressed air in the tanks 170 and 171 beyond the requirements of the compressed air motor 181, so that a sufficient quantity of compressed air is always available for the operation of the motor and the generator, thus insuring constant and continuous operation of the generator at the proper speed. The surplus air stored in the storage tanks also provides the additional power necessary for operation of the generator at peak load conditions, the supply of compressed air in the storage tanks being filled up at times when the output requirements of the generator are relatively low.

In order to increase the travel of the float 100 beyond the positions of high and low tide, a fluid passage or conduit 190 is provided adjacent the bottom wall of the cistern 20 and leading from the interior of the cistern through the side walls 13 of the basin 12. The end of the conduit 190 within the cistern 20 is disposed in a sump 191 in the bottom wall 24 of the cistern, and a downwardly directed spout or nipple 192 is provided on the outer end of the conduit.

A telescopic conduit 193 is connected at one end to the spout 192 and has an elbow 194 at its other end, and a conduit 195 leads from the elbow 194 through the side wall 102 of the float 100 below the deck 106 of the float, and into the tank 107 near the bottom of the tank.

A gate valve 196 is connected into the conduit 190 adjacent the cistern side of the wall 13, and a valve-operating shaft 197 extends upwardly from the valve 196 through the platform 17 and is provided at its upper end with a hand wheel 198 for controlling the valve 196.

Vent ducts, as indicated at 200, are disposed one at each corner of the rectangular tank 107, and each vent duct extends through the corresponding side wall of the tank and the adjacent side wall of the float body below the float deck 106 for conveying water from the interior of the tank to the outside of the float. These vent ducts are disposed near the bottom of the tank and a flap valve, as indicated at 201, is hinged to the inner end of each vent duct 200 at the upper side of the corresponding vent duct. A stem 202 projects perpendicularly outwardly from each flap valve 201, and a weight 203 carried on each stem at the outer end thereof tends to maintain the corresponding flap valve closed so that water cannot flow from the tank through the corresponding vent duct.

Bearing blocks, as indicated at 204, are mounted on the flanges 108 at the top of the tank and disposed one near each corner of the tank, and shafts 205 and 206 extend transversely of the tank one near each end thereof and are mounted at their ends in corresponding bearing blocks 204.

A frame 207 (Figure 3) projects upwardly from the deck of the float at the end of the shaft 206 adjacent the wall 13 and is provided with bearings 208 which support an extension 209 of the shaft 206. A shaft 210 is journaled in bearings 211 at the top of the frame 207 and above the shaft 206, and a crank 212 is secured on the end of shaft 210 adjacent the wall 13 and can be operated either from the platform 17 or the deck of the float to rotate the shaft 210. The shaft 210 is drivingly connected to the shaft 206 by chain sprockets 213 and 214 mounted on the shaft 210 and the shaft extension 209, respectively, and drivingly interconnected by a chain 215, and the shafts 205 and 206 are drivingly interconnected by chain sprockets 216 and 217 mounted on the shafts 205 and 206, respectively, and interconnected by a chain 218.

Winding drums 220 and 221 are mounted on the shaft 205 one near each side of the tank, and similar winding drums 222 and 223 are mounted on the shaft 206 one near each side of the tank.

Cords or cables, as indicated at 224, are wound one on each of the winding drums and each cable is connected to the weight 203 of the corresponding flap valve 201, so that when the crank 212 is turned in one direction, all of the flap valves are opened, and when the crank is turned in the other direction all of the flap valves are permitted to close under the influence of the weights 203.

With this arrangement and with the tank 107 empty, the float is permitted to descend with the falling tide until the tide reaches its lowest level or slack. At this time, with the flap valve 201 closed, the valve 196 is opened and water is admitted from the cistern 20 into the tank 107 on the float, this water sinking the float in the water remaining in the basin 12 at low tide. This sinking of the float beyond its floating position at low tide adds an important amount of longitudinal movement to the rack bars 132 and 133. When the tank 107 has been filled, the valve 196 is closed, cutting off the flow of water to the tank, and the crank 212 is then operated to open the flap valve 201 to permit the water to flow out of the tank 107, and the float to rise to its normal position of buoyancy. This rising of the float upon the discharge of water from the tank 107 also adds an important amount of movement to the rack bars 132 and 133, so that the movement of the sector gears 130 and 131 is actually much greater than that which would be obtained by the rise and fall of the tide alone.

As the float rises and falls, the telescopic conduit 193 expands and contracts so that a hydraulic connection between the conduit 190 and the tank 107 is maintained at all levels of the float. There is thus provided a simplified apparatus for generating electric power from the rising and falling of the tide, for maintaining continuous generation of the electric power and for supplying the additional power required for peak loads on the power-generating equipment. The efficiency of the apparatus is also greatly increased by the operation thereof beyond the slack of the tide and by the ability of the apparatus to take advantage of the maximum rise of the tide within practical limits.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A tide-operated power plant comprising a structure providing a basin open at one end, a cistern adjacent said basin, a platform adjacent said basin and a first water passage leading from the exterior of said structure into said cistern, a second water passage leading from the exterior of said structure into said basin, and a third water passage leading from said cistern into said basin, a flap valve assembly in said first passage admitting tide water into said cistern while precluding exit of tide water from said cistern through said first passage, manually operated valves in said second passage regulating flow of tide water into and out of said basin, a manually operated valve in said third passage regulating flow of water from said cistern into said basin, a movable structure closing the open end of said basin, a float in said basin, power-generating means on said platform, means drivingly connecting said float to said power-generating means for operation of the latter by rising and descending movements of said float in said basin, a tank mounted on said float, a water passage leading from the interior of said tank into said basin, a manually operated valve in the last-mentioned passage, and conduit means leading from said third water passage into said tank for filling the latter and sinking said float in water at the bottom of said basin at low tide to increase the range of movement of said float beyond the fall of the tide, the last-mentioned valve being opened after the sinking of the float to condition the float to rise with the rising tide.

2. A tide-operated power plant comprising a structure providing at least one cistern having a floor below high tide level, a water wall along one side of said cistern and having at least one opening therein extending below high tide level and a basin adjacent said cistern and having a floor below low tide level, a platform adjacent said basin and disposed above high tide level, power-generating apparatus mounted on said platform, means providing a water passage from the outside of said water wall into said basin, a float in said basin adjacent said platform, means drivingly connecting said float to said power-generating apparatus operating said apparatus by rising and falling movements of said float in said basin incident to the rising and falling of the tide, a tank on said float, manually controllable means hydraulically connecting said cistern with said tank for filling said tank and sinking said float in said basin at low tide, and manually controllable tank-venting means on said float for discharging the water from said tank and restoring the buoyancy of said float.

3. A tide-operated power plant comprising a structure providing a basin having a floor below low tide level and a platform adjacent said basin and disposed above high tide level, said basin being subject to the flow of tide water in and out, power-generating means mounted on said platform, a float in said basin, and means drivingly connecting said float to said power-generating means for operating the latter by rising and descending movements of said float incident to the rising and falling of tides in said basin, said means drivingly connecting said float to said power-generating means including energy storage means for driving said power-generating means at times at a rate in excess of the current rate of energy delivery by said float.

4. A tide-operated power plant comprising a structure providing a basin having a floor below tide level and a platform adjacent said basin and disposed above high tide level, said basin being subject to the flow of tide water in and out, power-generating means mounted on said platform, a float in said basin, and means drivingly connecting said float to said power-generating means for operating the latter by rising and descending movements of said float incident to the rising and falling of tides in said basin, said power-generating means comprising an electric generator and a compressed fluid motor drivingly connected to said generator, and said means drivingly connecting said float to said power-generating means including an air compressor mounted on said platform, a compressed air storage tank connected to said air compressor and to said fluid motor, and gear means drivingly connecting said float to said air compressor.

5. A tide-operated power plant comprising a structure providing a basin having a floor below low tide level and a platform adjacent said basin and disposed above high tide level, said basin being subject to the flow of tide water in and out, power-generating means mounted on said platform, a float in said basin, and means drivingly connecting said float to said power-generating means for operating the latter by rising and descending movements of said float incident to the rising and falling of tides in said basin, said float comprising a hollow body of elongated, rectangular shape having a bottom wall and a top wall provided with an opening of elongated rectangular shape therein, a plurality of hollow drums extending transversely of said body below said bottom wall and secured to said body, and a tank set into the opening in said top wall and having an open top and a bottom wall disposed below the top wall and above the bottom wall of said body.

6. A tide-operated power plant comprising a structure providing a basin having a floor below low tide level and a platform adjacent said basin and disposed above high tide level, said basin being subject to the flow of tide water in and out, power-generating means mounted on said platform, a float in said basin, and means drivingly connecting said float to said power-generating means for operating the latter by rising and descending movements of said float incident to the rising and falling of tides in said basin, said basin having one end open to an adjacent body of water, and a movable gate closing the open end of said basin and comprising a hollow body of elongated, rectangular, cross-sectional shape, ballast weights in the bottom of said body, ballast tanks in said body communicating with the exterior thereof, manually operated valves controlling the communication between said ballast tanks and the exterior of said body, a conduit extending transversely through said body intermediate the height thereof, a valve in said conduit, and valve-operating means extending one from each of said valves to the top of said body.

7. A tide-operated power plant comprising a structure providing a basin having a floor below low tide level and a platform adjacent said basin and disposed above high tide level, said basin being subject to the flow of tide water in and out, power-generating means mounted on said platform, a float in said basin, and means drivingly connecting said float to said power-generating means for operating the latter by rising and descending movements of said float incident to the rising and falling of tides in said basin, said basin having one end open to an adjacent body of water, a movable gate closing the open end of said basin and comprising a hollow body having flat and substantially parallel side walls, convexly curved end walls, a convexly curved bottom wall and a flat top wall, flanges extending along said end and bottom walls intermediate the thickness of said body, sealing strips of resilient material carried by said structure along the side and bottom edges of the open end of said basin engaged by said flanges to provide a water-tight seal between said gate and said structure around the open end of said basin, and means connected between said gate and said structure holding said gate in closing relationship to the open end of said basin.

8. A tide-operated power plant comprising a structure providing at least one cistern having a floor below high tide level, a water wall along one side of said cistern and having at least one opening therein extending below high tide level, and a basin adjacent said cistern and having a floor below low tide level, a platform adjacent said basin and disposed above high tide level, power-generating apparatus mounted on said platform, means providing a water passage from the outside of said water wall into said basin, a float in said basin adjacent said platform, means drivingly connecting said float to said power-generating apparatus operating said apparatus by rising and falling movements of said float in said basin incident to the rising and falling of the tide, a tank on said float, manually controllable means hydraulically connecting said cistern with said tank for filling said tank and sinking said float in said basin at low tide, manually controllable tank-venting means on said float for discharging the water from said tank and restoring the buoyancy of said float, a flap valve assembly disposed in the opening in said water wall admitting tide water to said cistern while precluding exit of water from said cistern through said opening, and a guard mounted in said opening at the outer side of said flap valve assembly to protect the latter from damage by water-carried objects.

VERNON W. HOWELL.

References Cited in the file of this patent

UNITED STATES PATENTS

| Number | Name | Date |
|---|---|---|
| 163,451 | Buckner, Jr. | May 18, 1875 |
| 583,821 | Sager | June 1, 1897 |
| 589,367 | Prescott | Aug. 31, 1897 |
| 618,729 | Reed | Jan. 31, 1899 |
| 659,609 | McIntyre | Oct. 9, 1900 |
| 901,117 | McManus | Oct. 13, 1908 |
| 975,157 | Quedens | Nov. 8, 1910 |
| 1,018,678 | Nelson | Feb. 27, 1912 |
| 1,029,030 | Sander | June 11, 1912 |
| 1,195,386 | Mould | Aug. 22, 1916 |
| 1,209,975 | Knowlton | Dec. 26, 1916 |
| 1,393,472 | Williams | Oct. 11, 1921 |

FOREIGN PATENTS

| Number | Country | Date |
|---|---|---|
| 743,601 | France | Jan. 10, 1933 |